Patented May 2, 1939

2,156,335

UNITED STATES PATENT OFFICE 2,156,335

ADHESIVE TAPE

Leon W. Geller, Astoria, Long Island, N. Y., assignor, by direct and mesne assignments of one-half to Nelson J. Fonarow and one-half to Edward J. Carter, both of New York, N. Y.

No Drawing. Application July 8, 1936, Serial No. 89,664

1 Claim. (Cl. 91—68)

This invention relates to adhesive tapes.

Heretofore, the backing used for adhesive tapes has been made either from cellulose, cellulosic material, or cellulose derivatives. Examples of these are paper, Cellophane, cloth, etc. Cellulose, as is well known, is a substance of vegetable origin and has a chemical composition which corresponds to a polybasic alcohol which is free from nitrogen.

The present invention provides an improved backing or base material for adhesive tapes which is of animal origin and has a different chemical composition from that of cellulose and cellulose derivatives. More specifically, the base material of the invention is gelatine, a protein, which can be mixed with numerous materials to provide advantages and qualities not readily obtainable heretofore in adhesive tapes. In accordance with the invention, one may obtain a drying or non-drying tape, a water-soluble or water-insoluble tape by applying adhesive compositions to gelatine sheets which have been previously modified and hardened. For improving the properties of the tape, the gelatine can be mixed before or after its hardening, with various substances of inorganic or organic origin. The products so obtained may thus be made to differ from the original material by newly acquired qualities, such as opacity, color, tenacity and other new properties.

Since gelatine sheets are usually brittle, they can be transformed into a very flexible material through the use of plasticizers, such as glycerine, alcohols, soaps, fats, sugar, sulphonated oils, sulphonated fats, borax-shellac solution, aliphatic dihydric alcohols and similar reacting substances. The product so obtained is of superior and satisfactory flexibility and it may be further improved by raising its viscosity through addition of substances like resins, sulphonated fats, sulphonated fatty alcohols and other substances which may produce the same effect upon gelatine. This procedure will produce a more or less transparent material, but in the gelatine, which is ready to be hardened and in which placticizers have already been introduced, there may also be incorporated other substances for the purpose of changing the appearance or improving the qualities of the original gelatine sheets. Such materials are dyestuffs, resins, waxes, gums, starch, urea, water-soluble gums, glass wool, synthetic tanning substances, perfumes, hydrogenated fats and oils, albumen, casein, tannic acid, cork, sawdust, asbestos, inorganic salts, leather, ammonium stearate, metallic soaps and many other substances. Thus, one may obtain a sheet of various colors, which may be opaque, phosphorescent, luminescent, perfumed, of higher tensil strength and which possesses other new and desirable properties.

The gelatine sheets, modified as indicated above, can be made waterproof by treating with solutions of potassium alum, or potassium chromate, or chrom sulphate, or chrom alum, or chrom chloride, or chrom peroxide, or with metallic salts of aluminum, iron, cerium, or by the action of chlorine, or hypochloric acid, or with solution of organic substances, such as of tannic acid, chinon, phenols, naphtols, acetaldehyde, or other aldehydes. The gelatine composition may be hardened by using formaldehyde which is one of the most important hardening agents for gelatine; and which may be brought to act upon the gelatine sheet in vapor form, or if desired, mixed with the gelatine mass in the presence of a hardening retarder, such as ammonia, and then cast and heated until hardened.

The thus obtained flexible, modified and waterproof hardened gelatine sheets may now be used instead of paper, cellulose derivatives or cloth, as a base for adhesive tapes.

The adhesive compositions for the tapes may be water-soluble or water-insoluble, of drying or non-drying type, and the finished product may be a transparent or an opaque tape, a colored or a phosphorescent or even a perfumed tape, depending not only on the kind of modified gelatine which has been used, but also upon the kind of adhesive which has been applied to the gelatine sheet. A clear, transparent resin adhesive will give a transparent tape whereas a resin-rubber adhesive will furnish an opaque tape.

For the production of a transparent water-soluble non-drying or pressure sensitive tape, the gelatine sheet is coated with a water-soluble adhesive, such as water-soluble resins mixed with dihydric aliphatic alcohols, and glue mixed with water-soluble resins and dihydric aliphatic alcohols. Under the term "dihydric aliphatic alcohols", it is understood there fall diabasic alcohols, such as glycol, diethylene glycol, triethylene glycol, di and trimethyl glycol and derivatives such as esters and ethers. There are generally soluble in water and are of a higher hygroscopicity than the trihydric aliphatic alcohols, for example, glycerine. But, in many cases the glycerine or a mixture of glycerine and dihydric alcohols is more desirable, due to the fact that they are less hygroscopical.

One manner of obtaining a water-soluble adhesive for a non-drying type of tape is as follows: The glue is first soaked in water until it swells, after which it is dissolved by heat in a steam jacketed kettle. To this is added, at a temperature of about 150° F., triethylene glycol, and the mixture stirred until a homogeneous mass is formed. Then a water-soluble adhesive resin is added, which will raise the viscosity of the mass in the same way as sugar will do. An example of the proportions which may be used is:

| | Parts |
|---|---|
| Glue | 1 |
| Water | 1 |
| Dihydric aliphatic alcohols | 2 to 4 |
| Resins | ½ to 1 |

Water-soluble gums, such as tragacanth, accacia, can also be added or they can be substituted for resin. Other materials, such as triethanolamine, zincstearate, calciumstearate, other metallic soaps, oils, fats, sulphonated aliphatic high molecular alcohols can be added with the purpose of balancing the qualities and properties of the adhesive compositions.

For the production of a transparent water-insoluble non-drying tape, the gelatine sheet is coated with a water-insoluble but transparent adhesive, such as adhesive-resins, for example, glyptal resins, vinyl resins. The resins are dissolved in a suitable solvent and, if necessary, modified by a plasticizer, after which operation they are ready to be applied on the tape.

The rubber adhesives are made from crepe or smoked sheets of rubber and resins or waxes, or with an admixture of both. By heating the rubber with resins and waxes, the rubber depolymerizes and forms adhesives. For the depolymerization of the rubber, there has been used mostly synthetic resins, such as glyptals, urea resins, aldehydes, condensation resins, vinyl resins, although it has been found that the chlorinated wax resins, especially chlorinated paraffin resins, depolymerize rubber easily forming adhesives of very good qualities. By the term "waxes" I refer especially to all the natural waxes, such as scale paraffin, paraffin, beeswax, candelilla wax, montan wax, carnauba wax. The chlorparaffin resins are obtained by chlorination of a paraffin solution. These last resins are of various consistency, from balsam-like to very hard, brittle resins, corresponding to the quantity of chlorine introduced in the paraffin. The waxes, it will be understood, of course, can also be chlorinated in the presence of other substances.

In a similar way, the rubber may be depolimerized by waxes, such as carnauba, montanic, candelilla or synthetic waxes. But, an admixture of resins and waxes, it has been found, gives better results. For this purpose the rubber is depolymerized on a rubber rolling mill, or in a mixer, to a plastic mass of desired consistency. The amount of resins and waxes necessary for the depolymerization will depend entirely on the quality of the materials and on the depolymerization power of these two depolymerization agents. An example of how this may be done in practice is given merely for the purpose of exposition. In a mixer provided with heat, the rubber sheets are introduced and under good mixing, the rubber is heated until it is soft enough and able to incorporate resins and waxes. These substances are added in small quantities until a sample shows that the depolymerized rubber has the desired adhesive properties. The depolymerized rubber adhesive is then dissolved in benzol or other solvents and is ready for application to the gelatine backing.

Previous to the application of the adhesive, the gelatine sheet may be covered, if required, on the surface to which the adhesive is applied, with a coating of waterproof or solvent-proof material, which will depend on the kind of substances used as adhesives, and also on the degree of desired transparency of the tape. For rubber or any kind of opaque gelatine tape, a rubber coating is very desirable, not only because it will serve as a protective coating but also because these two different layers, namely gelatine and rubber, give a very good material for the production of tapes. The rubber to be applied is dissolved in benzol. In case of a transparent tape, the protective layer can be a transparent resin, such as glyptal, or chlorinated rubber resin, which may be modified by a plasticizer.

Coatings made from chlorinated naphthalin waxes, especially in admixture with chlorinated rubber resins, serve as a desirable protective coating to be applied on the surface of the tape, which is free of adhesives.

What is claimed is:

A pressure sensitive adhesive tape consisting of a gelatine sheet treated on one side with a chlorinated rubber composition to form a waterproof backing, an adhesive on the treated side of said backing, and a coating obtained from a mixture of a chlorinated naphthalin wax and chlorinated rubber on the side of said tape which is free from said adhesive.

LEON W. GELLER.